Patented Jan. 22, 1929.

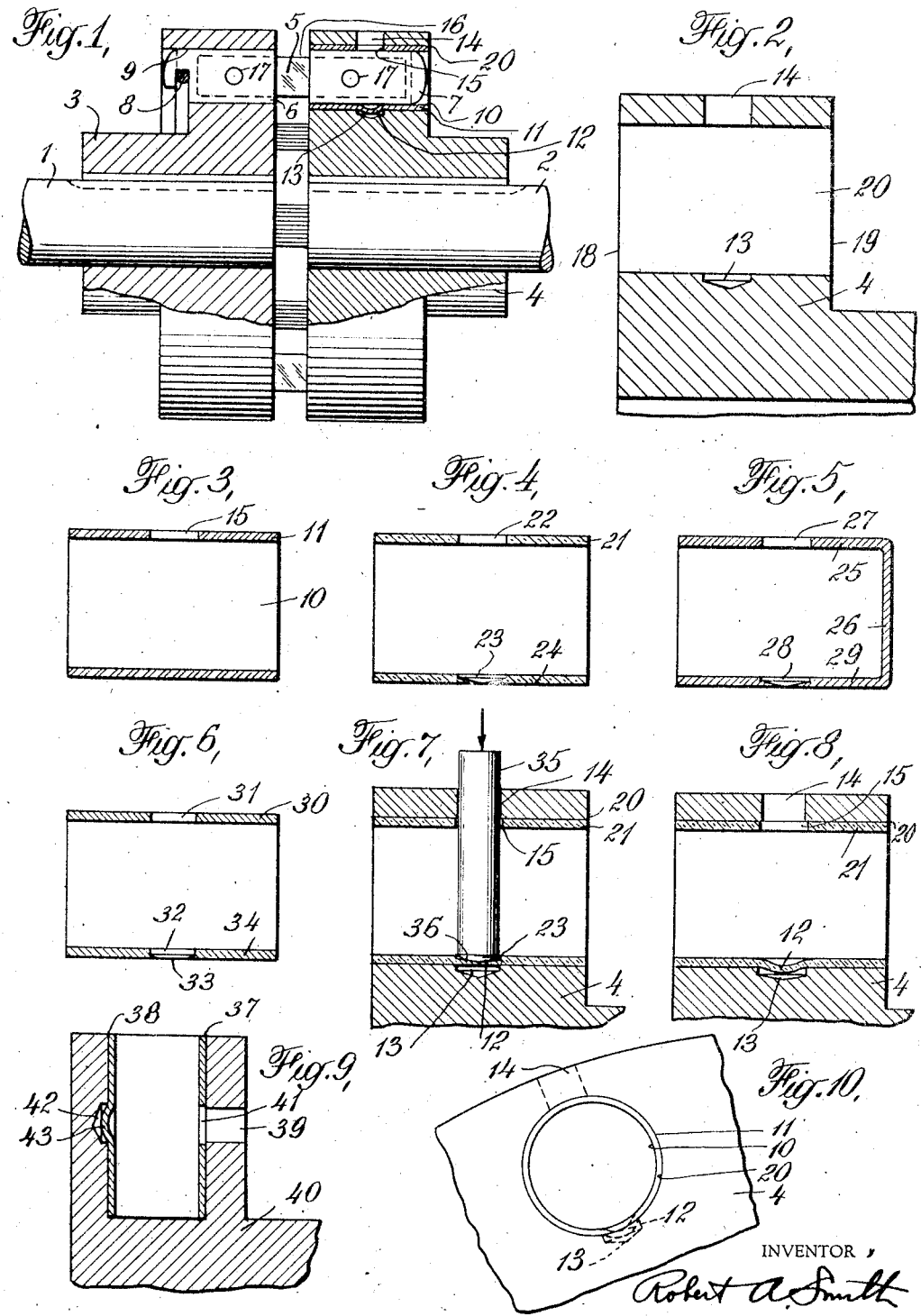

1,700,101

UNITED STATES PATENT OFFICE.

ROBERT A. SMITH, OF MAHWAH, NEW JERSEY, ASSIGNOR TO SMITH & SERRELL, A COPARTNERSHIP CONSISTING OF JOHN J. SERRELL AND HIMSELF, OF ELIZABETH, NEW JERSEY.

PROCESS FOR APPLYING AND REMOVING BUSHINGS.

Original application filed September 18, 1925, Serial No. 57,068. Divided and this application filed November 28, 1927. Serial No. 236,204.

The invention in this case, which is a division of my co-pending application Serial No. 57088, filed September 18, 1925, bushed flexible couplings, that is, contains subject matter taken therefrom, relates especially to processes of applying and removing bushings in flexible coupling members or the like, in which the flanged or other coupling members adapted to be connected to the shafts, and also in some cases an intermediate floating ring coupling member, are formed with apertures or holes in the members in which it is desired to easily and cheaply apply and remove a bushing when necessary. These coupling members may be of the usual type externally turned or otherwise shaped so that they may be mounted on or connected to shafts for transmitting torque and motion between the shafts. As is usual, these flanges or members may be connected by some one of the flexible connecting elements as for example, rigid steel pins or bolts surrounded with rubber or leather, or the connecting elements may be one of the many types of flexible laminated steel pins as shown in my Patent 1,165,551, of December 28, 1915, or in my joint patents with Serrell 1,403,271 and 2. After the holes in the flanges or members are made by drilling or other method, then the bushings are inserted in these holes and accurately and conveniently renewably fastened in the hole by the process of inserting through the intersecting hole a punch or die to swell out the bushing wall opposite the entrance of the intersecting hole into that portion of the intersecting hole of the flange or member. While of course this method of locking the bushings in place will usually be used in a round hole, it is of course evident that the same process might also be used for locking in a rectangular or some other form or shape of bushing. For convenience in this application I have shown the connecting members of the laminated steel pin form. It is also evident that the process of putting a bushing in a hole is not new, but my method of applying and removing the bushing is simpler and less expensive where it is desired, and the process will eliminate some careful and expensive machine work which I propose to avoid. The hole in the flange or member into which it is desired to insert and fasten a bushing has another smaller intersecting hole drilled approximately at right angles to the axis of the hole to be bushed. On the outer side this smaller intersecting hole extends to the exterior of the flange or member and on the inner side of the hole to be bushed the smaller intersecting hole extends only a small way into the metal of the part. The bushing is inserted in the hole to be bushed with the intersecting matching hole of the bushing matching approximately with the intersecting hole of similar diameter at the outer portion of the flange or member. Depending on the thickness of the bushing it may have a drilled portion or hole part way or completely through the diametrically opposite portion from the entrance of the intersecting hole in the bushing so that it will match up approximately with the inner portion of the intersecting hole in the flange or member, so when the bushing is inserted in the hole in the flange or member, the intersecting hole in the bushing matches with the corresponding intersecting hole in the flange and by driving on the punch through the two outer matching intersecting holes against the metal of the diametrically opposite wall of the bushing, the metal of the bushing wall may be driven into the end of the intersecting hole in the flange or member and thus the bushing locked in place. When it is desired to remove the bushing a drill is inserted through the outer matching intersecting holes and pressed against the diametrically opposite wall of the bushing to drill out the swelled out portion of the bushing. By this process it will be seen that the work is easily done without any special tools in the field and that I avoid the expensive process of press fitting or the use of collars or screws.

In the accompanying drawing showing in a somewhat diagrammatic way a number of illustrative embodiments of this invention, Fig. 1 is a longitudinal part section through a flexible coupling showing the flexible coupling members embodying this invention.

Fig. 2 is an enlarged sectional view of part of the coupling flange from the right hand end of Fig. 1 showing the part of the flange before the bushing is applied by this invention.

Fig. 3 is a sectional view of a bushing such as is used to bush the hole by this process.

Figs. 4, 5 and 6 show a somewhat different style of bushing.

Fig. 7 shows a flange as in Fig. 2 with the bushing inserted in place in the early part of the process and the punch inserted through the intersecting holes and ready to punch the metal of the bushing into the end of the intersecting hole in the flange.

Fig. 8 shows the next step in the process after the punch has been driven into the wall of the bushing to swell out the metal and then the punch removed.

Fig. 9 is a sectional view showing a bushing in a different position and the process completed by swelling the metal into the intersecting hole.

Fig. 10 is an end view of the bushing and the flange or member showing the process completed with the wall of the bushing swelled into the intersecting hole.

An illustrative form of coupling which may be bushed by this process is shown in Fig. 1 as comprising shaft 1 which may be connected to shaft 2 through a flexible coupling made up of flanges 3 and 4 keyed to the shafts 1 and 2 in the usual manner. The flanges 3 and 4 may be connected by a number of flexible connecting pins 5 which have as their ends pin keepers 6 and 7. The keeper may be detachably fastened in flange 3 by spring retaining ring 8 and keeper 6, when desired, therefore practically fastened without motion in pin hole 9. In the flexible connecting pins 5 as used in connection with a bushed pin coupling connecting springs 16 are, if desired, connected substantially without slide by the cross pins 17—17 to the keepers 6 and 7. The bushing 11 has been placed in the flange and locked in place by driving through the intersecting holes 14 and 15 with a punch to swell out the metal 12 of the bushing 11 into the end 13 of the intersecting hole 14 of the flange. The punch is then removed. The bushing 11 is therefore tightly and renewably held in place in the flange 4. Keeper 7 of the flexible connecting pin 5 is slipped in place inside hole 10 of bushing 11. When for any reason it is desired to remove this bushing the flexible pins 5 are withdrawn by releasing the spring retaining ring 8 and sliding the keeper 7 out of the hole 10 of the bushing. A drill, not shown in the drawing, is then inserted through the intersecting holes 14, 15 against the swelled out portion 12 of the bushing wall and the swelled out portion 12 drilled out so that the bushing 11 may be pushed out of the hole 20 in the flange 4.

In this way a flange 4 prepared as in Fig. 2 with the bushing hole 20 and the intersecting hole 14 and the intersecting hole end 13 may be used by my process with various bushings of the form as shown in Fig. 3 where the bushing 10 does not have the intersecting hole 15 enter the diametrically opposite wall of the bushing. Or the flange 4 prepared as in Fig. 2 may be used with the other forms of bushings shown in Figs. 4, 5 and 6 where the intersecting holes 22, 27 and 31 respectively are continued into the diametrically opposite wall forming the depressions 23, 28 and 32 respectively which part way pierce or completely pierce the bushing wall. In all these bushings either as in Figs. 3, 4, 5 or 6 the bushing is slipped into place in the flange as illustrated in Fig. 7 and then the punch 35 is inserted through the matching intersecting holes 14 and 15 so that the punch end 36 bears against the diametrically opposite wall of the bushing at 12.

The punch is then given a blow as indicated by arrow in Fig. 7 and this part of the process forces outward the diametrically opposite wall 12 of the bushing so as to form a swelled out portion 12 in Fig. 8. This is again shown in slightly different form as the swelled out portion 43 in Fig. 9 and the swelled out portion 12 in the end view in the Fig. 10. After the blow is struck as indicated in Fig. 7 the punch is withdrawn and the bushing will be locked in place by the swelled out portion of the bushing. The locking by this process is a very simple easy one and has the advantage of convenience and cheapness compared with any previous methods.

If at any time it is desired to remove the bushing, the bushing is unlocked by inserting an ordinary drill, not shown, through the intersecting holes 14 and 15 as in Fig. 8 against the swelled out portion 12 of the diametrically opposite wall. With the drill in this position only a slight drilling operation is necessary to drill out the entire swelled out portion 12 by using a drill which is approximately the size of the intersecting holes 14, 15 and also the size of the swelled out portion 12. After the swelled out portion 12 is drilled by the drill, the drill is removed and the bushing is pushed out from the hole in the flange or member.

This invention has been described in connection with a number of illustrative arrangements, number and order of steps, methods of manufacture and use and illustrative shapes, forms, proportions and articles which may be made by these processes, to the details of which disclosure the invention is not of course to be limited, since what is claimed as new and what is desired to be secured by Letters Patent is set forth in the appended claims.

I claim:

1. The process of applying a bushing in a hole in a flexible coupling flange which comprises inserting the bushing in the hole to be bushed and matching up an intersecting hole in the bushing with an intersecting hole in the flange, and inserting through the two matching intersecting holes a punch and applying force to the punch to swell out the wall of the bushing into the end of the intersecting hole in the flange, and then removing the punch.

2. The process of fastening a bushing in a hole in a flexible coupling member which comprises inserting the bushing in the hole to be bushed and matching up an intersecting hole in the bushing with an intersecting hole in the member, and inserting through the two matching intersecting holes a punch and applying force to the punch to swell out the wall of the bushing into a hole in the member, and then removing the punch.

3. The process of removing a bushing from a hole in a coupling member, said bushing having been applied by inserting the bushing in the hole to be bushed and matching up an intersecting hole in the bushing with an intersecting hole in the member, and inserting through the two matching intersecting holes a punch and applying force to the punch to swell out the wall of the bushing, and removing the punch, which comprises inserting a tool through the two matching holes to remove the swelled out portion of the wall so the bushing can be removed.

4. The process of fastening a bushing in a hole in a machined part which comprises inserting the bushing in the hole to be bushed and matching up an intersecting hole in the bushing with an intersecting hole in the part and inserting through the two matching intersecting holes a punch and applying force to the punch to swell out the wall of the bushing into the end of the intersecting hole in the part and then removing the punch.

5. The process of removing a bushing from a hole in a machined part, said bushing having been applied by inserting the bushing in the hole to be bushed and matching up an intersecting hole in the bushing with an intersecting hole in the part and inserting through the two matching intersecting holes a punch and applying force to the punch to swell out the wall of the bushing, and removing the punch, which comprises inserting a tool through the two matching holes to remove the swelled out portion of the wall so the bushing can be removed.

6. The process of removing a bushing from a hole in a machined part having a bushing in the hole with matched intersecting holes in the bushing and in the part, said bushing having a swelled out portion, which comprises inserting a tool through the two matching holes to remove the swelled out portion of the wall so the bushing can be removed.

7. The process of fastening a bushing in a hole in a machined part which comprises inserting the bushing in the hole to be bushed and matching up an intersecting hole in the bushing with an intersecting hole in the part and inserting through the two matching intersecting holes a punch and applying force to the punch to swell out the wall of the bushing.

ROBERT A. SMITH.